United States Patent
Suski et al.

(10) Patent No.: US 8,622,729 B2
(45) Date of Patent: Jan. 7, 2014

(54) DOUGH CUTTING AND STAMPING APPARATUS AND METHOD

(75) Inventors: Geoff Suski, Inver Grove Heights, MN (US); Frank Konkle, Elko, MN (US); Peter A. Huberg, Shoreview, MN (US); Ed Francis, Carl Junction, MO (US)

(73) Assignee: General Mills, Inc., Minneapolis, MN (US)

( * ) Notice: Subject to any disclaimer, the term of this patent is extended or adjusted under 35 U.S.C. 154(b) by 823 days.

(21) Appl. No.: 12/644,157

(22) Filed: Dec. 22, 2009

(65) Prior Publication Data

US 2010/0159095 A1 Jun. 24, 2010

Related U.S. Application Data

(60) Provisional application No. 61/140,473, filed on Dec. 23, 2008.

(51) Int. Cl.
*A21C 11/10* (2006.01)

(52) U.S. Cl.
USPC ........... 425/294; 425/235; 425/281; 425/298; 425/310; 425/316; 429/518

(58) Field of Classification Search
USPC ......... 425/202, 235, 281, 292, 294, 298, 307, 425/308, 310, 312, 315, 316, 221, 278, 279, 425/362, 396; 426/512, 518
See application file for complete search history.

(56) References Cited

U.S. PATENT DOCUMENTS

| | | | | |
|---|---|---|---|---|
| 1,728,702 | A | * | 9/1929 | Smith .......................... 425/292 |
| 1,841,495 | A | | 7/1932 | Mears |
| 1,871,755 | A | | 8/1932 | Smith |
| 1,944,112 | A | | 1/1934 | Schroder |
| 1,945,755 | A | * | 2/1934 | De Witt Seruggs, Jr. ..... 425/298 |
| 2,144,720 | A | * | 1/1939 | Gibson ......................... 426/302 |
| 2,230,778 | A | | 2/1941 | Flores |

(Continued)

FOREIGN PATENT DOCUMENTS

| | | |
|---|---|---|
| DE | 827183 C1 | 1/1952 |
| DE | 3332061 A1 | 3/1985 |

(Continued)

OTHER PUBLICATIONS

LeMatic, Inc. Modular Baking Systems, *"Random Dough Imprinter"*, brochure, 2 Pages.

(Continued)

*Primary Examiner* — Seyed Masoud Malekzadeh
(74) *Attorney, Agent, or Firm* — Everett G. Diederiks, Jr.; John L. Crimmins

(57) ABSTRACT

An apparatus is provided for forming, cutting and stamping a dough sheet into a plurality of uniformly stamped, imprinted dough pieces. The apparatus engages a leading portion of a dough sheet as it travels along a conveyor. The apparatus includes a drum rotatably disposed relative to the conveyor, a plurality of cutter molds disposed on the rotatable drum and a plurality of pattern imprinters formed within internal cavities defined by the plurality of cutter molds. Each of the cutter molds simultaneously cuts a dough piece received in the internal cavity and imprints on the dough piece to form a rounded edge roll. The pattern imprinter preferably has a star configuration for stamping the dough to form Kaiser-type rolls.

8 Claims, 5 Drawing Sheets

(56) References Cited

U.S. PATENT DOCUMENTS

| | | | | |
|---|---|---|---|---|
| 2,246,424 A * | 6/1941 | Turner | | 426/512 |
| 2,346,839 A | 4/1944 | Harriss et al. | | |
| 2,431,789 A * | 12/1947 | Cosgrove | | 425/182 |
| 2,525,987 A * | 10/1950 | Williamson | | 83/117 |
| 2,619,051 A * | 11/1952 | Rice | | 425/298 |
| 2,681,625 A | 6/1954 | Babbitt | | |
| 2,887,964 A * | 5/1959 | Griner | | 425/289 |
| 2,999,314 A | 9/1961 | Reichlein | | |
| 3,024,112 A * | 3/1962 | Burgess | | 426/497 |
| 3,154,986 A | 11/1964 | Reid | | |
| 3,225,718 A * | 12/1965 | Page | | 425/101 |
| 3,279,927 A | 10/1966 | Reid | | |
| 3,427,783 A | 2/1969 | Reid | | |
| 3,536,014 A * | 10/1970 | Kuchuris et al. | | 425/161 |
| 3,595,111 A | 7/1971 | Hershberger | | |
| 3,603,270 A * | 9/1971 | Tangel | | 99/450.6 |
| 3,880,030 A * | 4/1975 | Rosengren | | 83/863 |
| 3,880,069 A * | 4/1975 | Moline | | 99/483 |
| 3,911,805 A * | 10/1975 | Baird | | 99/353 |
| 4,193,272 A * | 3/1980 | Bernard | | 62/320 |
| 4,276,800 A * | 7/1981 | Koppa et al. | | 83/863 |
| 4,352,831 A * | 10/1982 | Cavanagh et al. | | 426/497 |
| 4,382,768 A * | 5/1983 | Lifshitz et al. | | 425/510 |
| 4,469,476 A * | 9/1984 | Cavanagh et al. | | 425/216 |
| 4,534,726 A | 8/1985 | Simelunas | | |
| 4,543,053 A | 9/1985 | Jasniewski | | |
| 4,578,027 A * | 3/1986 | Koppa et al. | | 425/298 |
| 4,608,918 A | 9/1986 | Funabashi et al. | | |
| 4,671,759 A | 6/1987 | Hayashi et al. | | |
| 4,789,555 A | 12/1988 | Judd | | |
| 4,808,104 A | 2/1989 | D'Orlando | | |
| 4,881,889 A * | 11/1989 | Spiel et al. | | 425/383 |
| 5,162,119 A * | 11/1992 | Pappas et al. | | 425/92 |
| 5,204,125 A | 4/1993 | Larsen | | |
| 5,216,946 A * | 6/1993 | Huang et al. | | 99/353 |
| 5,306,133 A * | 4/1994 | Dayley | | 425/217 |
| 5,375,509 A | 12/1994 | Taylor et al. | | |
| 5,388,489 A * | 2/1995 | Dayley | | 83/117 |
| 5,402,715 A * | 4/1995 | Kurachi et al. | | 99/450.2 |
| 5,529,799 A * | 6/1996 | Bornhorst et al. | | 426/549 |
| 5,540,140 A | 7/1996 | Rubio et al. | | |
| 5,552,101 A * | 9/1996 | Fujii et al. | | 264/163 |
| 5,565,220 A * | 10/1996 | Rubio et al. | | 425/168 |
| 5,576,033 A * | 11/1996 | Herrera | | 425/217 |
| 5,601,012 A | 2/1997 | Ellner | | |
| 5,622,742 A | 4/1997 | Carollo | | |
| 5,641,527 A * | 6/1997 | Burger | | 426/94 |
| 5,662,949 A * | 9/1997 | Rubio et al. | | 425/310 |
| 5,667,834 A * | 9/1997 | Rubio et al. | | 426/503 |
| 5,687,638 A | 11/1997 | Makowecki | | |
| 5,759,608 A * | 6/1998 | Momiyama | | 426/557 |
| 5,871,783 A * | 2/1999 | Capodieci | | 425/174.2 |
| 6,024,554 A * | 2/2000 | Lawrence | | 425/310 |
| 6,055,897 A * | 5/2000 | Mysliwiec | | 83/698.41 |
| 6,168,817 B1 * | 1/2001 | Pavan | | 426/503 |
| 6,268,005 B1 * | 7/2001 | Brewer | | 426/502 |
| 6,279,440 B1 | 8/2001 | Truttmann et al. | | |
| 6,298,760 B1 * | 10/2001 | Truttmann et al. | | 83/52 |
| 6,305,260 B1 * | 10/2001 | Truttmann et al. | | 83/52 |
| 6,530,771 B1 * | 3/2003 | Clark | | 425/194 |
| 6,555,152 B1 * | 4/2003 | Roso | | 426/516 |
| 6,562,389 B1 | 5/2003 | Yusufi | | |
| 6,851,192 B2 | 2/2005 | So | | |
| 6,902,754 B1 | 6/2005 | Evans et al. | | |
| 7,331,120 B2 | 2/2008 | Scherb et al. | | |
| 7,421,947 B2 | 9/2008 | Bryan | | |
| 7,771,182 B2 * | 8/2010 | Fornaguera | | 425/133.1 |
| 7,828,543 B2 * | 11/2010 | Herrera | | 425/196 |
| 7,914,834 B2 * | 3/2011 | Fu et al. | | 426/503 |
| 2006/0286244 A1 * | 12/2006 | Fu et al. | | 426/549 |
| 2010/0196564 A1 * | 8/2010 | Cepeda Mendoza et al. | | 426/297 |
| 2010/0227024 A1 | 9/2010 | Flores | | |

FOREIGN PATENT DOCUMENTS

| | | |
|---|---|---|
| DE | 3410162 C1 | 3/1985 |
| EP | 0130772 A2 | 1/1985 |
| EP | 0841009 A2 | 5/1998 |
| EP | 0841009 A3 | 5/1998 |
| FR | 2195892 A5 | 3/1974 |
| FR | 2643229 A1 | 8/1990 |

OTHER PUBLICATIONS

Gemini Bakery Equipment Co., "We're with you from beginning to end", brochure, 2 Pages.

Dodge, Vajra Equipment & Consulting, Inc., "Professional Machinery for Food Industry", brochure, 4 Pages.

Rademaker B.V., "Make Up Lines the most Versatile Approach", booklet, 26 Pages.

The Moline Company, A Division of Pillsbury Company, Moline Bulletin 529, "Round Cutters" p. 1, printed in USA at least prior to 1991.

* cited by examiner

DOUGH CUTTING AND STAMPING APPARATUS AND METHOD

CROSS-REFERENCE TO RELATED APPLICATIONS

The present invention claims the benefit of U.S. Provisional Patent Application Ser. No. 61/140,473 entitled "Dough Cutting and Stamping Apparatus and Method" filed Dec. 23, 2008.

FIELD OF THE INVENTION

The invention pertains to the art of food production and, more particularly, to an apparatus and method for shaping, cutting and stamping dough to form uniformly stamped dough pieces.

BACKGROUND

A number of methods have been employed in order to make various types of bread products, such as loaves, buns, rolls, biscuits and breadsticks, from a sheet of dough. In such systems, a sheet of bread dough may typically be extruded, reduced and conveyed along a dough travel path to one or more cutting apparatus, such as slitter wheels, guillotine-type cutter molds, reciprocating head cutter molds, or rotatable drum-type cutter molds. In general, such cutting techniques render a baked product having sharp edges, rather than round edges resembling a hand made product. In the past, a rounded edge product has been obtained by placing small balls of dough in rollers which roll the balls of dough into a substantially spherical shape. The dough spheres (or dough balls) are then placed in individual baking pans so that they can be baked, much as a conventional dinner roll is baked by a consumer. However, such techniques are very low throughput techniques. They are, thus, less than desirable for commercial applications in which it is imperative to process many pounds of dough per minute.

Further, it is often desirable to imprint the top of the dough pieces with a pattern such as a Kaiser pattern, a cross, a cloverleaf, etc. In the prior art, dough pieces are imprinted by stamping in a further processing step that takes place after the dough pieces are cut. For example, U.S. Pat. No. 7,421,947 discloses a roll forming apparatus wherein dough rolls are formed and subsequently moved to an imprinter by a conveyor. The system includes a stop gate positioned in the path of the rolls to stop the rolls in a desirable position for imprinting. Sensors are then used to detect the position of the rolls to ensure that the imprinter is aligned with the rolls. Once the rolls are imprinted, the conveyor is re-activated to index the next group of rolls for imprinting. Therefore, in accordance with this arrangement, the cutting and imprinting are separately performed, while the imprinting is performed in batches. However, such a multi-step process can render aesthetically unpleasing stamped dough pieces. For example, the imprint may be stamped inconsistently on each dough piece, resulting in a non-uniform batch of stamped dough products. The depth of the imprint may also vary undesirably with such a two step process.

In addition, the use of a two step process where the dough product is subsequently stamped results in a slowing of the overall processing of such dough products. Thus, such a process provides a disadvantage in that it cannot be efficiently used in a high speed production line.

SUMMARY OF THE INVENTION

The invention is directed to an apparatus and method for forming, cutting and stamping a dough sheet into a plurality of uniformly stamped dough pieces. The apparatus engages the dough sheet, which includes a first surface with a first skin and a second surface with a second skin, as it travels along a conveyor. The apparatus includes a drum, rotatably disposed relative to the conveyor, and a plurality of cutter molds disposed on the rotatable drum for engaging the dough sheet as the dough sheet moves along a dough travel path. A plurality of pattern imprinters are formed within each of the plurality of cutter molds such that the dough is simultaneously shaped, cut and imprinted. Each of the cutter molds includes a periphery having a dough engaging portion for forming rounded edges and a dough cutting edge for severing the dough sheet into a plurality of dough pieces.

In one embodiment, the pattern imprinter has a star configuration for stamping the dough to form dough pieces suitable for making a Kaiser-type roll. The star configuration includes a center portion that penetrates fully through the dough sheet and a plurality of fins extending radially from the center portion. Each of the fins includes an inner end, an outer end and a sloped middle section, wherein each of the outer ends only partially penetrates through the dough sheet. Thus, the dough sheet can be continuously advanced, while being cut and formed into a roll shape, and simultaneously stamped with a pattern imprinter to yield a plurality of uniformly stamped dough pieces.

Additional objects, features and advantages of the invention will become more readily apparent from the following detailed description of the embodiments when taken in conjunction with the drawings wherein like reference numerals refer to corresponding parts in several views.

DETAILED DESCRIPTION

Figure 1:
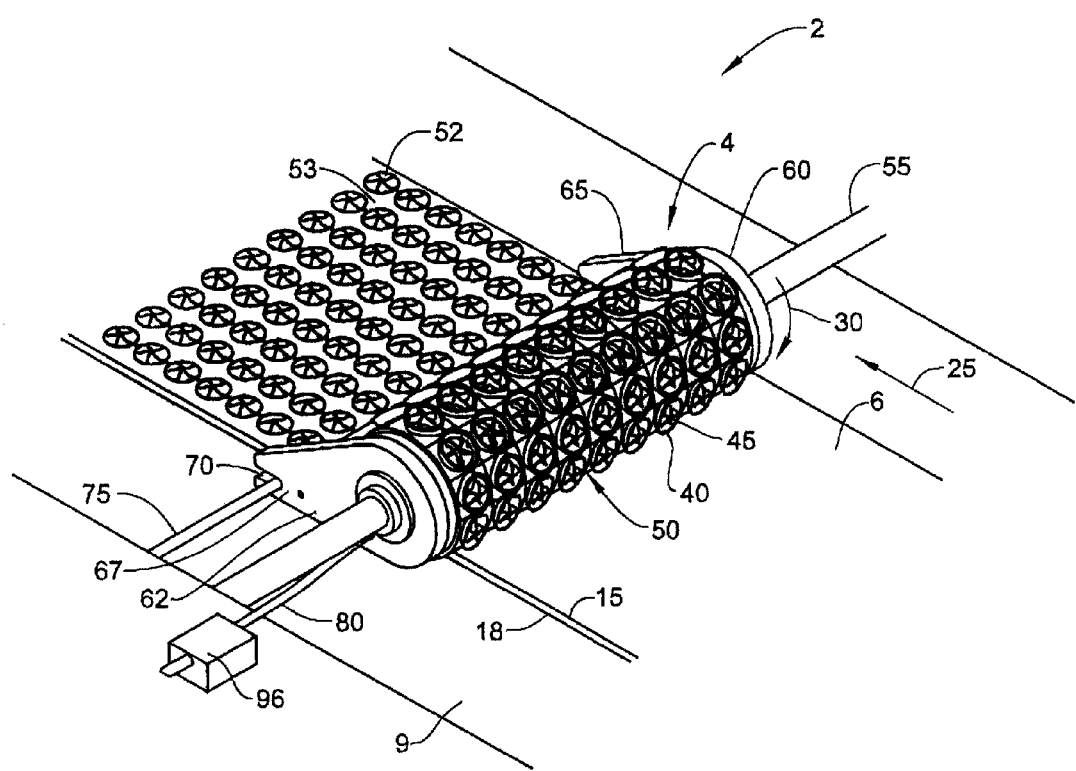
FIG. 1 illustrates a dough shaping, cutting and stamping apparatus in accordance with the present invention.

With initial reference to FIG. 1 a food product assembly line 2 incorporating the dough shaping, cutting and stamping apparatus 4 in accordance with the present invention is depicted. As shown, food product assembly line 2 has a sheet of dough 6 traveling from right to left upon a conveyor 9. Although not shown, it should be understood that the dough is formed in a batch maker or the like and transferred to food product assembly line 2 where it is processed into sheet 6 which has first surface 15 with a first skin and a second surface 18 with a second skin. As shown in this portion of food product assembly line 2, the sheet of dough 6 is delivered by conveyor 9 to dough shaping, cutting and stamping apparatus 4. As dough sheet 6 moves in the direction indicated by arrow 25, dough shaping, cutting and stamping apparatus 4 rotates in the direction indicated by arrow 30.

As will be described more fully below, dough shaping, cutting and stamping apparatus 4 includes a plurality of cutter molds, one of which is indicated at 40, and a plurality of pattern imprinters, one of which is indicated at 45, disposed on an exterior surface 47 of a cylindrical, rotatably driven drum 50 for cutting and stamping dough sheet 6 into a desired number of uniformly patterned pieces. The plurality of cutter molds 40 including pattern imprinters 45 are mounted relative to the conveyor 9 such that, when dough sheet 6 is traveling in the direction indicated by arrow 25, cutter molds 40 engage the dough sheet, receive and shape the dough, and sever it to provide a plurality of cuts in dough sheet 6, resulting in the formation of individual dough products 52 and intermediate, recyclable dough pieces 53. Drum 50, can either be positively driven, or simply driven by the frictional engagement between the cutter molds 40 and dough sheet 6 or the conveyor 9. In operation, cutter molds 40 extend all the way through dough sheet 6 to lightly engage conveyor 9 and thereby completely sever dough sheet 6. After the cuts are made in dough sheet 6, dough sheet 6 continues traveling in the direction indicated by arrow 25 to a post processing station (not shown). The post processing station can include, for example, proofing, baking, freezing and/or packaging.

Figure 2:
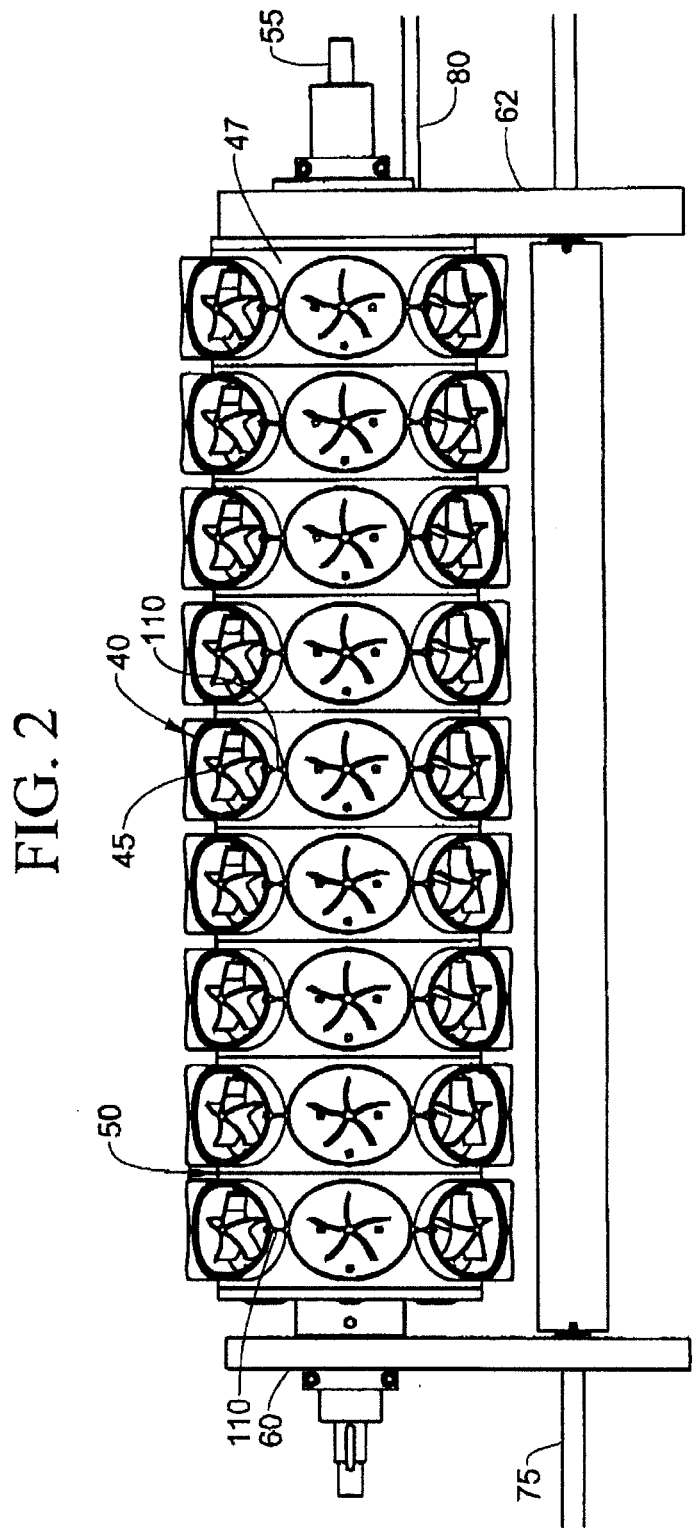
FIG. 2 is a side view of the rotary drum cutter of the dough shaping, cutting and stamping apparatus of FIG. 1.

More specifically, with reference to FIG. 2, cylindrical drum 50 of dough shaping, cutting and stamping apparatus 4 is mounted on a drive shaft 55 and includes side plates 60 and 62 on either side of cylindrical drum 50. Side plates 60 and 62 include elongated side end portions 65 and 67 that extends in the direction of travel of the dough sheet 6. Each elongated side end portion 65 and 67 includes a notch 70 (see FIG. 1) formed therein for receiving a pivot shaft 75, which extends parallel to drive shaft 55. Pivot shaft 75 allows cylindrical drum 50 and drive shaft 55 to pivot and lift up off of the dough sheet 6 when desired, such as at the end of a production cycle. Freely rotatably mounted on pivot shaft 55 is a dough roller 77. An air supply hose 80 is also provided to supply air from an air source, such as an air compressor (not shown). Air that enters cylindrical drum 50 through hose 80 is used to force the dough to be discharged from cutter molds 40 after the dough is cut and stamped as will be discussed further below.

Figure 3:
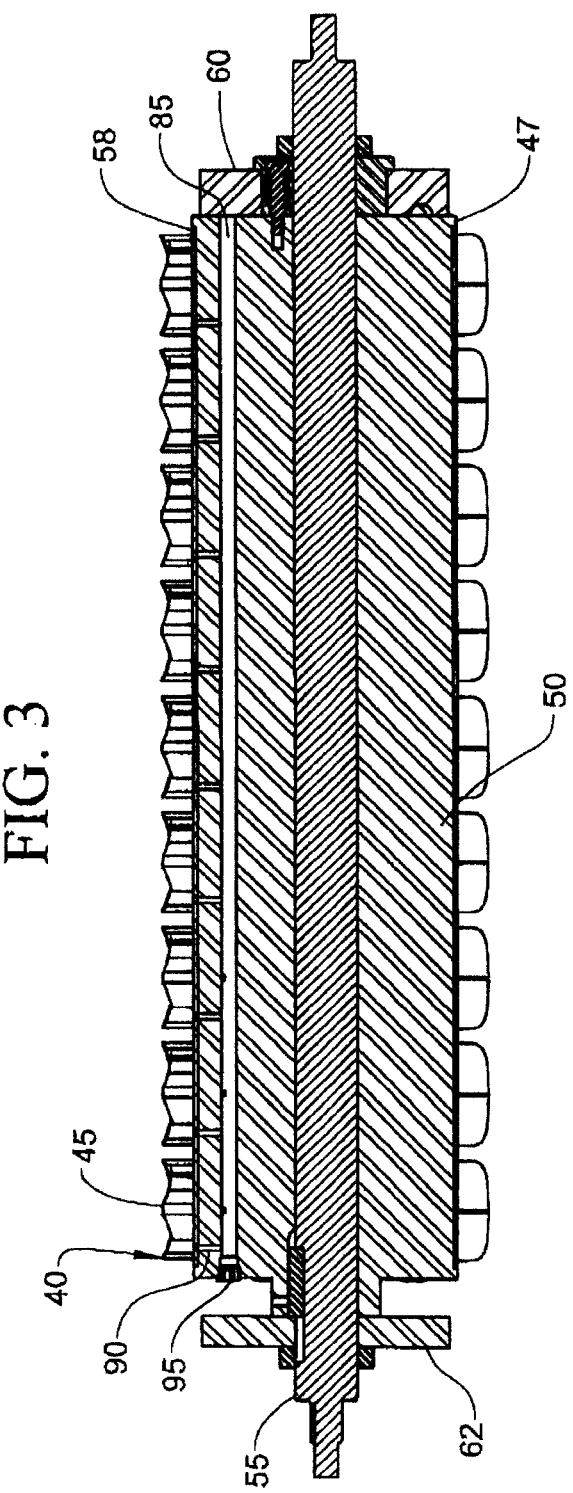
FIG. 3 is a cross-sectional view of the rotary drum cutter of FIG. 2.
Figure 4:
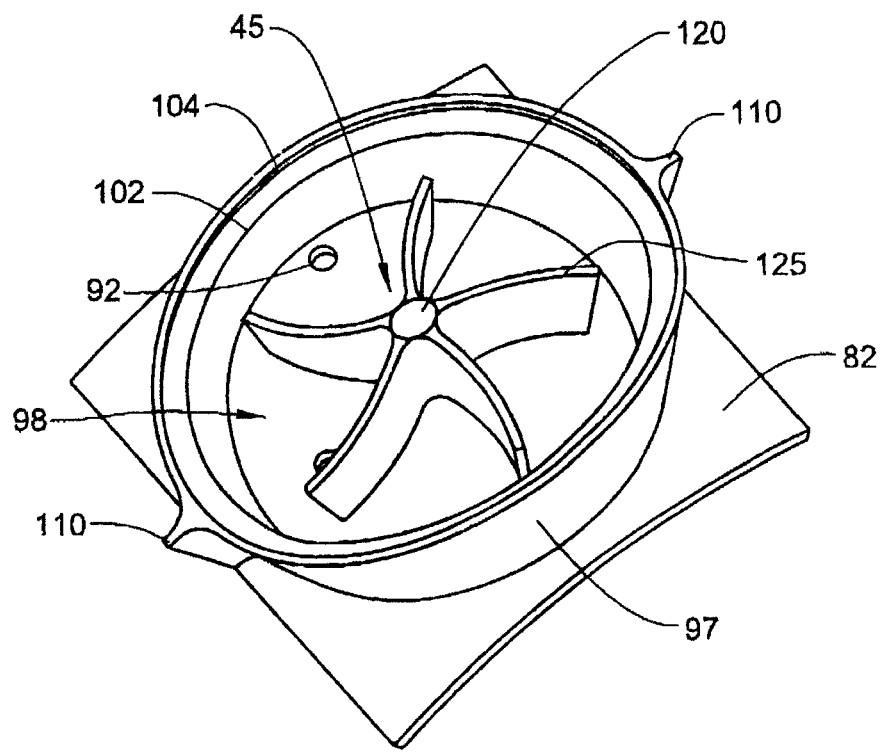
FIG. 4 is a perspective view of a cutter mold provided as part of the rotary drum cutter of FIG. 2.
Figure 5:
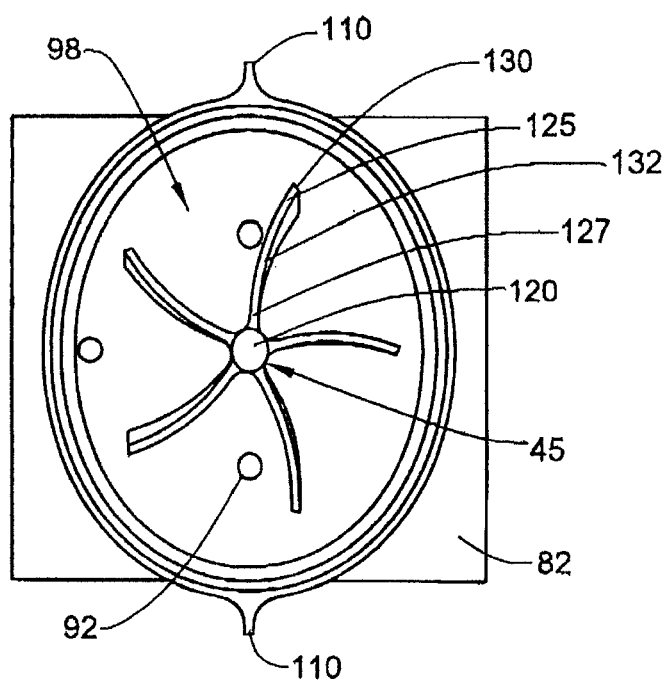
FIG. 5 is a bottom view of the cutter mold of FIG. 4.

FIG. 3 illustrates a cross-sectional view of the cylindrical drum 50 of dough shaping, cutting and stamping apparatus 4 in accordance with the invention. As shown, drive shaft 55 extends through cylindrical drum 50, with a plurality of the cutter molds 40 and a plurality of pattern imprinters 45 are disposed on the exterior surface 47 of cylindrical drum 50. In one embodiment, the various cutter molds 40 are provided as part of a sleeve 82 that extends about exterior surface 47 and is secured for rotation with drum 50. However, it should be realized that cutter molds 40 could also be provided directly on exterior surface 47. Although various materials could be used to form cutter molds 40, stainless steel is a preferred material. As also shown, various elongated air passageways, one of which is shown at 85, extend through cylindrical drum 50. A plurality of air outlets, one of which is indicated at 90, stems from elongated air passageway 85 to provide air to a respective cutter mold 40. As illustrated in FIGS. 4 and 5, exterior surface 47 of cylindrical drum 50 and sleeve 58 have aligned apertures 92 formed therein. Each air outlet 90 is exposed to a set of apertures 92 for a respective cutter mold 40, with sets of three apertures 92 being illustrated. With this arrangement, air enters elongated air passageway 85 through hose 80, which is adapted to attach to inlet port 95 at one end and an air supply (not shown) at another end, with an air regulator 96 (see FIG. 1) interposed there between. As will be discussed further herein, air can be timely forced out apertures 92 from air outlets 90 to discharge the dough from a respective cutter mold 40. For use in connection with making Kaiser rolls, it has been found that providing 5-15 psi to three spaced apertures 92 per cutter mold 40 is effective, although the number and relative positioning of the apertures, as well as the pressure employed, could be readily varied.

FIGS. 4-7 represent perspective, bottom plan, sectional side and front elevational views, respectively, of cutter mold 40 and pattern imprinter 45 in accordance with the present invention. Cutter mold 40 has a peripheral side wall 97 defining an internal dough receiving cavity 98, with peripheral side wall having a dough engaging portion 102 which is relatively thick and blunt. In accordance with one aspect of the present invention, dough engaging portion 102 is slightly rounded or concave. In an alternate embodiment, dough engaging portion 102 may be slightly convex. Regardless of the configuration, dough engaging portion 102 results in the production of a rounded cut dough product. Thus, rather than having its edges straight and substantially squared off, the produced dough product 52 has substantially rounded edges formed by the upper surface 15 of dough sheet 6 being pulled toward the bottom surface 18 of dough sheet 6, and sealed thereto. In the embodiment shown, dough product 52 constitutes a roll. With these rounded edges, when the roll is baked, it has an aesthetically look that closely resembles a handmade roll.

In the embodiment shown, the periphery 97 of cutter mold 40 also has an additional cutting edge 104. Cutting edge 104 forms an annular ring generally disposed about the outer periphery of cutter mold 40, and is much narrower than the remainder of the annular ring which forms the depth of cutter mold 40. In one embodiment, cutting edge 104 is only approximately a fraction, e.g. 1/16 (1.6 mm) or less, of an inch in thickness. Cutting edge 104 can be a flat edge, or it can be sharpened or tapered. Therefore, cutting edge 104 actually severs dough sheet 15, while dough engaging portion 102 provides a blunt dough engaging surface which is sufficiently thick to frictionally engage and pull the top surface 15 of dough sheet 6 toward the bottom surface 18 thereof in order to shape and seal the dough, or to pinch them together with possibly only a small gap between the two surfaces, in order to provide the eventual rounded dough product. Since cutting edge 104 is provided, the cutting pressure required to cut through or sever dough sheet 6 has been observed to be less than that required for a cutter which has no such cutting edge. Certainly, it is desired to make a smooth dough cut during operation. To this end, the front and rear edge portions 104a and 104b of cutting edge 104 are specifically configured to be concave in shape, while the opposing side edge portions 104c and 104d are convex. Basically, the curvature of front and rear edge portions 104a and 104b are identical and clearly shown in FIG. 7, while the curvature of side edge portions 104c and 104d are identical to each other, different from the curvatures of front and rear edge portions 104a and 104b, and mimic the side curvature of sleeve 82, while sleeve 82 defines a convex bottom for the internal dough receiving cavity 98 of each of the cutter molds 40, as clearly shown in FIGS. 6 and 7. With this construction, there is a smooth, sloped transitional engagement with dough 6, with each cutter mold 40 smoothly transitioning from initial engagement with dough 6 by front edge portion 104a, to the subsequent engagement of side portions 104c and 104d and then to the final engagement along rear edge portion 104b. In addition, cutting edge 104 of each cutter mold 40 includes radial extensions 110 for connecting adjacent cutter molds 40 and establishing the intermediate dough pieces 53 (FIG. 1). That is, radial extensions 110 create additional cuts in dough sheet 6 to further facilitate removal of the individual dough products, e.g., rolls 52, after the forming, cutting and stamping operation.

Figure 6:
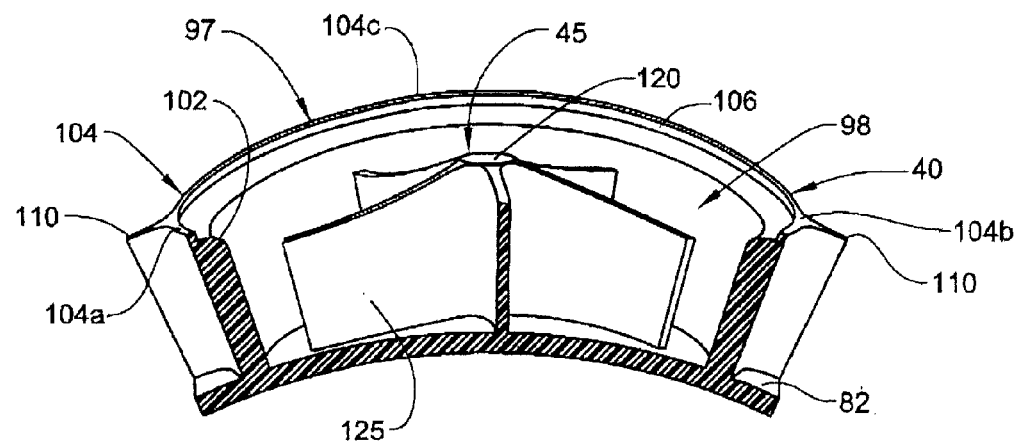
FIG. 6 is a cross-sectional side view of the cutter mold of FIG. 4.
Figure 7:
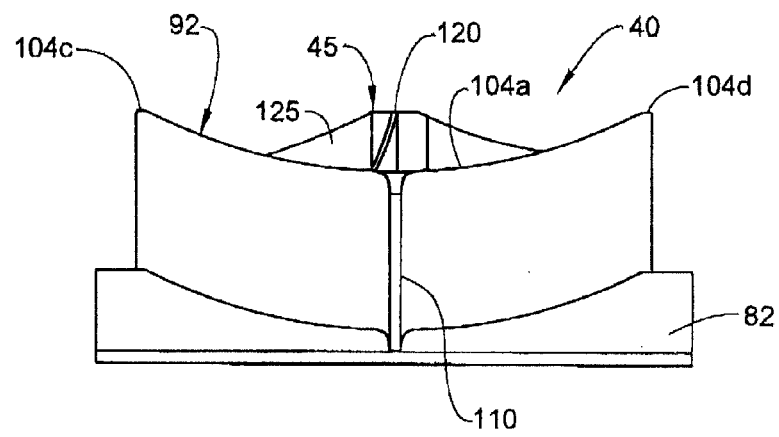
FIG. 7 is a front elevational view of the cutter mold of FIG. 4.

It is often desirable to imprint the top of the dough pieces with a pattern, such as a Kaiser pattern, a cross, a cloverleaf or the like. In the prior art as discussed above, such an imprinting process would be performed separate and distinct from the cutting process. However, for this purpose, each cutter mold 40 includes a pattern imprinter 45 provided substantially centrally in internal cavity 98. In the embodiments shown in FIGS. 4-6, each pattern imprinter 45 has a star configuration with a center post portion 120 and a plurality of fins, one of which is indicated a 125, extending radially from center portion 120. Each of the fins 125 includes an inner end 127, an outer end 130 and a sloped middle section 132. In operation, simultaneously with the cutting operation, each of the center portions 120 is designed to substantially, fully penetrate the dough sheet 6, while inner end 127, center portion 120 and outer end 130 of each fin 125 penetrate the dough sheet 6 to a decreasing depth, respectively. As best shown in FIG. 6, center portion 120 of the star configuration extends from exterior surface 47 of drum 50 at a height equal to the height of cutting edge 104. Thus, center portion penetrates dough sheet 6 at the same distance as cutting edge 104. However, fins 125 are sloped such that outer ends 130 of fins 125 penetrate dough sheet 6 to a much lesser depth, e.g., ¼-⅜ inches (approximately 0.6-1.0 cm). Thus, the integrity of the dough piece is maintained.

Further embodiments of cutter mold 40 are also encompassed by the current invention. For example, dough engaging portion 102 may be composed of rounded corners with a generally flattened region therebetween. In this case, the corners should be rounded sufficiently to avoid breaking the skin on the upper surface of dough sheet 6 until the upper skin has been stretched and drawn toward the lower skin and pinched thereto. The faster dough sheet 6 moves, the more likely cutter mold 40 is to break the skin, so the more blunt or rounded the corners should be. Alternatively, the flattened portion may include a raised edge such that less cutting pressure required to sever dough sheet 6. Cutter mold 40 may also include a lower portion having corners, which can either be rounded or sharp, and which lead to portions that taper to a most extreme outer peripheral edge of cutter mold 40. The angle defined by tapering portions is a relatively large angle, and is sufficient such that the extreme outer periphery avoids breaking the skin of dough sheet 6, until that skin has been drawn toward the opposite skin, and pinched or sealed thereto. Similarly, the corners are preferably rounded, but are at least formed at angles which are sufficiently large to avoid breaking the dough skin which it engages, until it is pinched or sealed to the opposite dough skin. Further details regarding alternative embodiments for cutter mold 40 are disclosed in U.S. Pat. No. 6,902,754, which is herein incorporated by reference.

Based on the above, it should be readily apparent that the dough shaping, cutting and stamping apparatus of the present invention provides a number of significant advantages over prior art dough cutting and pattern imprinting arrangements. Initially, it is important to recognize that the inclusion of the pattern imprinter in the cutting mold avoids the need to successively perform these multiple operations at different production stages, such that the invention greatly enhances overall production capabilities. In addition, the inclusion of the cutting molds with imprinters on a rotatable roller provides for continuous product production versus the use of more conventional vertical stamping machines which require some pause in the conveyance of product. The particular configuration of the cutting molds enables the effective shaping, cutting and stamping operations to be performed, which again is significant as the cutting molds are rotated during operation. Furthermore, the inclusion of the timed air discharge into the cutting molds is important to the overall ability of the system to accept and shape a requisite amount of dough within the cutting mold, yet assure that the dough is timely removed from the mold. Therefore, the simultaneous cutting and stamping of dough using a rotary drum cutter with dough discharge assistance in accordance with the present invention synergistically combines to provide for a high throughput with enhanced product formation. Although the present invention has been described with reference to preferred embodiments, it should be readily understood that various changes and/or modifications, such as the use of other dough force discharge arrangements including mechanical devices, may be made without departing from the spirit and scope of the invention.

The invention claimed is:

1. An apparatus for forming, cutting, and stamping a dough sheet, having a first surface with a first skin and a second surface with a second skin, into a plurality of stamped roll forms as the dough sheet travels in a dough travel path along a conveyor, the apparatus comprising:
   a rotatable drum mounted for rotation above the conveyor;
   a plurality of cutter molds disposed about said rotatable drum, each of the cutter molds including a peripheral side wall defining an internal, dough receiving cavity and a cutting edge portion including a front portion, a rear portion and opposing side portions, with the front and rear portions having curvatures which are identical to each other and concave in shape, while the opposing side portions have curvatures which are identical to each other, different from the curvatures of the front and rear portions, and convex in shape; and
   a pattern imprinter provided within the internal cavity of each of said cutter molds wherein, when the dough sheet travels in the dough travel path and the drum is rotated, dough is received in the internal, dough receiving cavities of the cutter molds and the cutting edge portions engage the dough sheet, severing the dough sheet into a plurality of dough pieces having rounded edges while the pattern imprinters simultaneously penetrate at least partially through the dough to imprint a pattern on each of said dough pieces.

2. The apparatus according to claim 1, wherein the pattern imprinter has a center portion adapted to substantially, fully penetrate through the dough sheet.

3. The apparatus according to claim 2, wherein the pattern imprinter has a star configuration.

4. The apparatus according to claim 3, wherein the star configuration includes at least five fins extending radially from said center portion, each of said fins including an inner end, an outer end and a sloped middle section, each of said outer ends being adapted to only partially penetrate the dough sheet.

5. The apparatus according to claim 4, wherein each of said fins slopes from the inner end to the outer end such that the center portion, the inner end and the outer end of each of said fins is adapted to penetrate the dough sheet to a decreasing depth.

6. The apparatus according to claim 1, further comprising:
   an air passageway extending within the rotatable drum;
   at least one aperture provide in each of the cutter molds and opening into the internal cavity; and
   a plurality of air outlets interconnecting the air passageway and the at least one aperture for delivering air to the internal cavities of the cutter molds for use in ejecting said dough pieces.

7. The apparatus according to claim 1, further comprising: a radial extension projecting from the peripheral side wall for forming intermediate dough pieces between the plurality of uniformly stamped roll forms.

8. An apparatus for forming, cutting, and stamping a dough sheet, having a first surface with a first skin and a second surface with a second skin, into a plurality of stamped roll forms as the dough sheet travels in a dough travel path along a conveyor, the apparatus comprising:
- a rotatable drum mounted for rotation above the conveyor;
- a plurality of cutter molds disposed about said rotatable drum, each of the cutter molds including a peripheral side wall defining an internal, dough receiving cavity and a cutting edge portion including a front portion, a rear portion and opposing side portions, with each of the front and rear portions having a curvature that is concave in shape and each of the opposing side portions having a curvature that is convex in shape;
- a pattern imprinter provided within the internal cavity of each of said cutter molds wherein, when the dough sheet travels in the dough travel path and the drum is rotated, dough is received in the internal, dough receiving cavities of the cutter molds and the cutting edge portions engage the dough sheet, severing the dough sheet into a plurality of dough pieces having rounded edges while the pattern imprinters simultaneously penetrate at least partially through the dough to imprint a pattern on each of said dough pieces; and
- a sleeve supporting the plurality of cutter molds, said sleeve extending about and being secured to the rotatable drum, wherein the sleeve defines a convex bottom for the internal cavity of each of the cutter molds.

* * * * *